US012553197B2

(12) United States Patent
Berning et al.

(10) Patent No.: US 12,553,197 B2
(45) Date of Patent: Feb. 17, 2026

(54) SELF-PROPELLED EARTH WORKING MACHINE HAVING TWIN MOTORS AND A WORKING TRANSMISSION TRANSMITTING THEIR POWER OUTPUT VARIABLY

(71) Applicant: Wirtgen GmbH, Windhagen (DE)

(72) Inventors: Christian Berning, Züplich (DE); Olaf Gaertner, Linz (DE); Christopher Mittelstädt, Neustadt (DE)

(73) Assignee: Wirtgen GmbH, Windhagen (DE)

( * ) Notice: Subject to any disclaimer, the term of this patent is extended or adjusted under 35 U.S.C. 154(b) by 224 days.

(21) Appl. No.: 18/366,235

(22) Filed: Aug. 7, 2023

(65) Prior Publication Data

US 2024/0076840 A1 Mar. 7, 2024

(30) Foreign Application Priority Data

Sep. 5, 2022 (DE) ...................... 10 2022 122 472.4

(51) Int. Cl.
*E01C 23/088* (2006.01)
(52) U.S. Cl.
CPC ................................ *E01C 23/088* (2013.01)
(58) Field of Classification Search
CPC ..... E01C 23/088; E01C 23/127; B60K 25/00; B60K 2025/022; B60Y 2200/41; F16H 7/00; F16H 47/04
See application file for complete search history.

(56) References Cited

U.S. PATENT DOCUMENTS 3,844,184 A * 10/1974 Nelson ................... B02C 17/24
74/665 GA
7,976,106 B2 7/2011 Berning et al.
(Continued)

FOREIGN PATENT DOCUMENTS

DE 102012006189 A1 10/2013
DE 102012012738 A1 1/2014
(Continued)

OTHER PUBLICATIONS

European Search Report for corresponding patent application No. 23194878.7, dated Feb. 7, 2024, 13 pages (not prior art).
(Continued)

*Primary Examiner* — Carib A Oquendo
(74) *Attorney, Agent, or Firm* — Lucian Wayne Beavers; Patterson Intellectual Property Law, PC (57) ABSTRACT

A self-propelled earth working machine includes a machine frame, a working apparatus, at least one function apparatus, a drive system including first and second motors, a function transmission and a working transmission. The working transmission is configured to transmit torque between the drive system and the working apparatus. The working transmission connects the first motor and the second motor to the working apparatus for the transmission of torque such that the working apparatus may be driven to perform the earth working movement solely by the first motor or solely by the second motor or jointly by the first and second motors, wherein the working transmission connects the first motor to the working apparatus at a first transmission ratio and connects the second motor to the working apparatus at a second transmission ratio different from the first transmission ratio.

19 Claims, 3 Drawing Sheets

(56) References Cited

U.S. PATENT DOCUMENTS

| | | | |
|---|---|---|---|
| 10,000,897 | B2 | 6/2018 | Reuter et al. |
| 10,287,882 | B2 | 5/2019 | Barimani et al. |
| 10,358,780 | B2 | 7/2019 | Berning et al. |
| 10,464,414 | B2 | 11/2019 | Christ et al. |
| 2018/0058214 | A1* | 3/2018 | Berning ............... E01C 23/088 |

FOREIGN PATENT DOCUMENTS

| | | | |
|---|---|---|---|
| DE | 102015002743 A1 | 6/2016 | |
| DE | 202015004528 U1 | 9/2016 | |
| DE | 102015111249 A1 | 1/2017 | |
| EP | 1983105 A2 * | 10/2008 | ............ E01C 21/00 |
| EP | 1983105 B1 | 10/2013 | |

OTHER PUBLICATIONS

German Office Action for corresponding patent application No. 10 2022 122 472.4, dated Apr. 5, 2023, 6 pages (not prior art).

* cited by examiner

SELF-PROPELLED EARTH WORKING MACHINE HAVING TWIN MOTORS AND A WORKING TRANSMISSION TRANSMITTING THEIR POWER OUTPUT VARIABLY

RELATED APPLICATIONS

The present application claims priority to German Patent Application No. DE 10 2022 122 472.4, filed Sep. 5, 2022, which is incorporated herein by reference.

BACKGROUND OF THE DISCLOSURE

Field of the Disclosure

The present invention relates to a self-propelled earth working machine having a machine frame, which is supported by a traveling gear, the traveling gear standing on a ground and comprising a plurality of drive units rollable on the ground.

A working apparatus designed for earth working is accommodated on the machine frame as a first power recipient, the working apparatus being drivable to perform a working movement relative to the machine frame.

The machine frame accommodates at least one function apparatus distinct from the working apparatus as a further power recipient.

The machine frame accommodates a drive system, which provides a working drive power to the working apparatus and a function drive power to the at least one function apparatus of the earth working machine.

A working transmission is situated between the drive system and the working apparatus in order to transmit torque between the drive system and the working apparatus. A function transmission is situated between the drive system and the at least one function apparatus in order to transmit torque between the drive system and the at least one function apparatus.

The drive system comprises a first motor and a second motor, each of which is connected by the working transmission to the working apparatus for the transmission of torque in such a way that for performing a normal earth working operation, the working apparatus is drivable to perform the working movement solely by the first motor or solely by the second motor or jointly by the first and the second motor.

Description of the Prior Art

Such an earth working machine in the form of a road milling machine is known from EP 1 983 105 B1 (U.S. Pat. No. 7,976,106).

This printed publication specifies that the first and the second motor may be of identical construction or of different construction. In the case of the use of different motors, the maintenance costs of the drive system are normally higher, since different maintenance specifications may apply to each of the two motors, maintenance personnel must be trained accordingly and separate spare parts must be procured for each motor, which are not interchangeable between the motors. When using structurally identical motors, maintenance costs are indeed lower, but the range of use of the drive system is limited, since within the essentially identical usable speed range, disregarding low to negligible differences due to manufacturing and assembly tolerances, both the first as well as the second motor have the same speed-torque characteristic curve, for example.

DE 10 2012 006 189 A1 (U.S. Pat. No. 10,000,897) discloses an earth working machine, again in the form of a road milling machine, the drive system of which has a more powerful main drive and a less powerful auxiliary drive, the torque paths of which run via a planetary gear as a summation gear to the working apparatus. Thus it is possible, by way of the auxiliary drive, to rotate the working apparatus at a lower speed during a maintenance operation and to rotate it at a higher speed and in particular at a higher power output during an earth working operation. It is likewise possible, initially to use the auxiliary drive to accelerate the milling drum to a speed at which the main drive can be added for further rotational acceleration of the milling drum. In normal earth working operation, however, the milling drum is always driven solely by the main drive. The auxiliary drive is not designed and developed for driving the milling drum during a normal earth working operation.

Another earth working machine having a milling drum is known from DE 10 2015 002 743 A1 (U.S. Pat. No. 10,358,780). The known earth working machine comprises a control device, which is designed to adjust the speed of the milling drum as a function of at least one measured variable characteristic for a critical operating state of the milling drum, for example a load torque as a function of time during the operation, to the operating conditions of the earth working machine in such a way that the milling drum is operated in a non-critical operating state. The adaptive control of the speed of the milling drum thus achieved makes it possible to operate the earth working machine at an optimized working point with regard to the speed of the milling drum. The characteristic measured variable is acquired by a signal receiving unit provided for its acquisition and is transmitted to the control device.

DE 10 2015 111 249 A1 (U.S. Pat. No. 10,287,882) discloses a road milling machine as an earth working machine, the control device of which is designed to set machine parameters, with which the earth working machine is operated, by taking into account material properties of the ground to be worked so as to achieve an advantageous wear behavior of the utilized earth working tools.

SUMMARY OF THE DISCLOSURE

Starting from the aforementioned EP 1 983 105 B1 (U.S. Pat. No. 7,976,106), it is an object of the present invention to improve the known earth working machine in such a way that it is able to make use of a greater operating parameter range within which it can be operated during an earth working operation. By setting operating parameters in a more targeted manner for an earth working operation, it is thus possible to conserve resources and extend maintenance cycles.

Starting from the earth working machine described at the outset, the present invention achieves this object in that the working transmission connects the first motor to the working apparatus at a first transmission ratio and connects the second motor to the working apparatus at a second transmission ratio differing from the first.

By using different transmission ratios when transmitting motor power output of the first and of the second motor to the working apparatus, it is possible to achieve a spread of the contributions of the first and of the second motor to the total drive power output of the drive system, which on account of the different transmission ratios occurs even when advantageously using structurally identical motors as the first and the second motor.

A particularly great spread of the motor power output transmitted to the working apparatus may be achieved by using different motors, which respectively may have a different motor power output and at the same time preferably different usable speed ranges. It is then possible to operate the working apparatus during a normal earth working operation with a particularly wide speed range. The motors may differ but be based on the same physical operating principles. Both motors may be internal combustion engines, for example. It shall not be precluded, however, that the motors output drive power based on different physical operating principles.

The first and the second motor in this context preferably each have a nominal power in the range of 150 to 800 kW, more preferably in the range of 300 to 750 kW, particularly preferably of 550 to 650 kW.

However, since the provision of different transmission ratios for the first and the second motor already ensures a spread of the speed range available at the working apparatus and since furthermore the use of structurally identical motors as the first and the second motor offers the advantage of a considerable reduction in maintenance costs, the first and the second motor are preferably structurally identical motors. Structurally identical motors in this context are in particular motors that are offered and sold by the same motor manufacturer under the same model designation, even if the motors may differ with respect to individual components that do not significantly influence their nominal power output and their nominal operating behavior. In motor manufacturing, it is not unusual for reasons of security of supply to engage two sources for individual components, which supply components for one and the same motor model that are substantially identical in their action, but nominally not identical.

Preferably, the first and the second motor are respectively internal combustion engines, particularly preferably diesel engines. These may be operated in normal earth working operation at their working points optimized according to specified boundary conditions, for example particularly low in emissions or particularly low in consumption.

In principle, it shall not be precluded that one or both of the motors use different physical operating principles and may be for example developed as electric motors. At the same nominal power output, thermal engines, however, normally have a narrower speed range in which they can be operated and are thus less freely controllable than electric motors due to the combustion processes necessary for their operation. Hence, the use of the working transmission presented here having different transmission ratios for the two mentioned motors makes sense particularly for thermal engines.

The earth working machine may be for example a road milling machine, a recycler, a stabilizer or a surface miner. These earth working machines all have the working apparatus mentioned at the outset, which, set in motion, is designed for earth working operation. More precisely, these earth working machines all have a working apparatus, which is designed for earth removal work such as a milling drum rotatable about a milling axis, for example. The working movement is therefore preferably a rotary working movement, although a different working movement, for example a reciprocating translatory and/or rotary working movement possible by using an eccentric drive, is in principle not precluded.

In principle, the different transmission ratios in the working transmission may be provided in any manner in terms of construction. A preferred robust structural design of the working transmission having different transmission ratios for the first and for the second motor may be obtained in that the different transmission ratios of the working transmission are brought about in the interaction with the first and the second motor by rotating transmission components having respectively different effective diameters. The rotating transmission component may be for example at least one of the following components: a gear wheel, a friction wheel, and a belt pulley.

Since, in the event that a particularly high milling power is required, the presently discussed earth working machine transmits the drive power of both the first as well as of the second motor via the working transmission to the working apparatus, in this operating state with the power of both motors output to the working apparatus, each torque-transmitting transmission component of the working transmission is initially connected at least indirectly to each motor for joint movement. In this context, a connection for joint movement of two components means that due to the physical connection, the one component always rotates when the other component rotates.

More precisely, a first rotating transmission component having a first effective diameter is preferably connected for joint movement with the first motor and a second rotating transmission component having a second effective diameter differing from the first is connect for joint rotation with the second motor. The first rotating transmission component is situated in the torque path from the first motor to the second rotating transmission component between the first motor and the second rotating transmission component and the second rotating transmission component is situated in the torque path from the second motor to the first rotating transmission component between the second motor and the first rotating transmission component. In this manner, it is possible to achieve the desired varied transmission ratios between the first motor and the working apparatus on the one hand and the second motor and the working apparatus on the other hand despite the at least indirect connection of all torque-transmitting transmission components of the working transmission to both the first as well as the second motor.

The working transmission preferably comprises or is a traction drive. In principle, the traction drive may be a form-locking traction drive. In this case, the traction means may be a chain, such as a roller chain or plate link chain, or a toothed belt. The traction drive is preferably a force-locking traction drive, so that there is in principle the possibility of slip between the traction means and at least one transmission component. Although slip in the working transmission is not desired, in the event that both motors simultaneously transmit power to the working apparatus via the working transmission, slip may equalize instantaneous differences in power outputs without applying excessive stress on transmission components of the working transmission or on power-outputting output shafts of the first or of the second motor. Slip thus makes it possible briefly to reduce load peaks on transmission components or on the first or second motor.

The utilized ordinal numbers "first" and "second" do not denote a sequence, but only differentiate otherwise similar components or component sections and indicate their functional and/or structural association with either the first or the second motor. Of those components or component sections, of which according to the present description only the first or only the second may be present, it is normally possible for a second component associated with the second motor to be present, without therefore a similar first component necessarily having to be present. The same applies to component sections instead of components.

In terms of construction, in an advantageously simple and reliable manner, the first rotating transmission component may be at least one transmission component of the following:
  i) a first deflection pulley deflecting a traction means of the traction drive and
  ii) a first toothed wheel or friction wheel situated in a torque path from the first motor to the first deflection pulley.

Option i) is preferred, in which the deflection pulley rotates, preferably without interposition of a further transmission stage, with the output shaft of the first motor at the same speed. This entails the lowest number of components for implementing the input side of the working transmission for introducing torque of the first motor into the working transmission.

If, however, due to boundary conditions of available installation space for example, a distance orthogonal to the axis of rotation of the output shaft of the first motor must be bridged in order to reach the first deflection pulley, then option ii) may be chosen. Normally, a transmission stage is then implemented between the first motor and the first deflection pulley, in which the power output of the first motor is transmitted to the first deflection pulley by changing the speed and torque directly output by the first motor.

If necessary, the options i) and ii) may also be used in combination, for example by using a transmission stage between the first motor and the deflection pulley in order to achieve a radial offset of the torque path, a portion of the transmission ratio of the working transmission for the first motor being effected by the transmission stage and a further portion being effected by the deflection pulley.

What was said about the first motor and the first rotating transmission component may additionally or alternatively also apply to the second motor and the second rotating transmission component. Accordingly, the second rotating transmission component may be at least one transmission component of the following:
  i) a second deflection pulley deflecting a traction means of the traction drive and
  ii) a second toothed wheel or friction wheel situated in a torque path from the second motor to the second deflection pulley.

What was said above about the first motor and about the first rotating transmission component applies mutatis mutandis to the second motor and the second rotating transmission component.

For example, the transmission ratio of the motor power output of the one motor of the first and second motors via the working transmission to the working apparatus may be a speed reduction or torque increase with a transmission ratio in the range of 13.5:1 to 16.5:1, in particular 14:1 to 16:1.

Likewise, the transmission ratio of the motor power output of the respective other motor of the first and second motors may be a speed reduction or torque increase with a transmission ratio in the range of 17.5:1 to 20.5:1, in particular 18:1 to 20:1.

In addition to the traction drive, the working transmission may comprise a planetary gear acting in the torque path between a third deflection pulley associated with the working apparatus and the working apparatus. The planetary gear preferably acts in a manner that reduces speed and steps up torque.

In principle, the first or the second motor may introduce power directly into the function transmission. In a preferred specific embodiment, the motor having the greater speed-reducing transmission ratio introduces power directly into the function transmission. If the first and the second motor are structurally identical in the sense of this application, the motor having the greater speed-reducing transmission ratio of the working transmission effects the slower working movement on the working apparatus.

As was explained at the outset, the working apparatus may be driven to perform the working movement solely by the first motor or solely by the second motor or jointly by the first motor and the second motor. For this reason, in a preferred specific embodiment of the present invention, for implementing these different operating modes, a first switchable clutch is situated in a first torque path between the first motor and the working apparatus in order to interrupt or close the first torque path as a function of the switching state of the first switchable clutch. The second motor is thus able to provide the torque for moving the working apparatus alone, without having to pull the first motor along.

Alternatively or preferably additionally, a second switchable clutch may be situated in a second torque path between the second motor and the working apparatus in order to interrupt or to close the second torque path as a function of the switching state of the second switchable clutch. This makes it possible to drive the working apparatus solely by the first motor, without the latter having to drag the second motor along.

The at least one function apparatus, which is driven via the function transmission distinct from the working transmission, makes an important contribution to the operation of the earth working machine independently of an earth working operation by the working apparatus. Thus, by driving a hydraulic pump as a function apparatus, it is possible to provide hydraulic pressure for hydraulic devices, for example for lifting devices for raising and lowering the machine frame relative to the traveling gear, for steering individual drive units and for driving hydraulic motors and thus for providing propulsion on the individual drive units and consequently on the working apparatus. Likewise, by driving an electrical generator as a possible function apparatus, electrical current may be provided for electrical consumers of the earth working machine, for example for the illumination and the control system of the earth working machine. Likewise, by driving a pneumatic pump, pneumatic pressure may be provided for pneumatic devices, for example for pneumatic piston-cylinder systems.

To ensure that the function apparatuses are drivable independently of the operation of the working apparatus, preferably for one motor of the first and second motors, it is necessary that the switchable clutch situated in the torque path between the one motor and the working apparatus interrupts, as a function of its switching state, a transmission of torque from the one motor to the working apparatus, but does not interrupt a transmission of torque from the one motor to the function transmission. Since the first and the second motor are kinematically coupled by the working transmission, in principle, every apparatus directly drivable by one of the two motors is indirectly also drivable by the other motor. Preferably, the function transmission is associated with one of the two motors of the first and the second motor, so that according to a preferred development of the present invention it is necessarily the case for the respective other motor of the first and second motors that the switchable clutch situated in the torque path between the other motor and the working apparatus interrupts, as a function of its switching state, both a transmission of torque from the other motor to the working apparatus as well as to the function transmission.

The function transmission may be, in a manner known per se, a transfer gear, the number of output shafts of which is greater than its number of input shafts. Preferably, the function transmission has only one input shaft, into which one motor of the first and second motors introduces torque directly. In the same way, the function transmission preferably has more than one output shaft, in order to drive more than only one function apparatus. Since the earth working machines mentioned at the outset to a considerable extent use hydraulic pressure as an energy source for function units, preferably a plurality of hydraulic pumps and/or gas pumps, in particular pneumatic pumps, are situated on the transfer gear. For this reason, the function transmission is often referred to as a pump transfer gear in the technical world.

As was already explained above, the at least one function apparatus may comprise or be at least one liquid pump and/or at least one gas pump and/or at least one electrical generator and/or at least one mechanical auxiliary drive.

In a particularly preferred manner, the earth working machine comprises an auxiliary drive independent of the two motors for driving the milling drum in maintenance operation. In maintenance operation, the milling drum should rotate at a markedly reduced speed and torque compared to the working operation. By using an additional auxiliary drive, preferably as an electric motor or hydraulic motor, the energy for which is preferably provided by an energy store such as a battery, a rechargeable battery or an hydraulic accumulator, a rotation of the milling drum in maintenance operation is thus made possible independently of the operation of the two discussed combustion engines.

In principle, the working apparatus may be any earth-working working apparatus. Preferably, the working apparatus discussed here comprises or is an earth-removing milling drum designed and situated to rotate about a milling axis. Milling bits are situated on the outer circumferential surface of a milling drum tube via bit holders or preferably bit exchange holders. For the purpose of conveying the earth material excavated by the milling bits from the ground composite away from the milling drum, the milling bits are normally arranged in a spiral-shaped manner, particularly preferably as a double spiral running in opposite axial directions from an axial center area of the milling drum in relation to the milling axis, respectively one spiral running on each side of the axial center area of the milling drum away from this axial center area.

Since the motors normally have a higher speed than the working apparatus and at the same time provide a lower torque than what is needed for an earth working operation by the working apparatus, the working transmission preferably transmits the power output both of the first as well as of the second motor by reducing the speed and stepping up the torque output at the respective speed to the working apparatus.

Driving one and the same working apparatus using two basically independent motors, which are coupled on their output side by a working transmission, may be challenging in certain operating situations in terms of coordinating the operating parameters of the two motors kinematically coupled by the working transmission. In this connection, particularly the operation with the parallel output of motor power from the first and second motor to the working apparatus presents challenges for controlling the operation of the motors and of the working apparatus. For this reason, the present invention also relates to a method for operating a self-propelled earth working machine, as it was described and developed above, by a control device of the earth working machine, wherein the first and the second motor simultaneously output power to the working apparatus, comprising:

a) the step of controlling one of the two motors of the first and second motors to a target speed determined by a user input and/or by at least one acquired value of a sensor and/or by query of a data relationship, b) the step of controlling the respective other of the two motors of the first and second motors to a movement variable of speed and torque, the value of the movement variable of the other motor differing from the value of the same movement variable of the speed-controlled one motor by a differential ratio, which differs from the differential ratio of the first and of the second transmission ratio of the working transmission.

Starting from an input of the machine operator and/or of sensor acquisitions, the sensor acquisition also including the acquisition of a torque transmitted to the working apparatus and/or of a torque output by one of the motors, one of the two motors is controlled to a predetermined speed. This is the speed-controlled motor of the two motors. The speed of the speed-controlled motor depends on the desired or required setpoint working speed of the working apparatus. The setpoint working speed of the working apparatus is normally the specified variable for an earth working operation. In the preferred case of a milling drum as the working apparatus, the working speed of the latter is its rotational speed. The setpoint working speed may depend for example on the desired travel speed, the desired milling depth in the case of a milling drum as the working apparatus and the properties of the ground to be worked, such as its hardness and the like.

Particularly preferably, in connection with controlling the normal earth working operation of the milling drum as the preferred working apparatus, the control device is designed to acquire operating parameters such as the current speed of the milling drum and/or the torque output by the motors and/or the milling depth and/or the travel speed during the operation of the earth working machine. By evaluating these machine parameters, for example on the basis of stored and previously defined parameter relationships, it is possible to infer properties of the ground to be worked. Taking into account these ascertained properties of the ground to be worked, it is then in turn possible to ascertain and set an optimized rotational speed for the current working situation in order to ensure a particularly effective and/or economical operation.

The other of the two motors may also be either speed-controlled or may be torque-controlled by the control device. In order to prevent the two motors from mutually influencing each other in an undesired manner with respect to their speeds, the two motors are respectively controlled to a target speed, which differ from each other by a different differential ratio than the differential ratio of the transmission ratios of the working transmission for the two motors. Alternatively, the other of the two motors is controlled to a target torque, which differs from the torque of the one motor, which the latter outputs at its target speed, by different differential ratio than the differential ratio of the transmission ratios of the working transmission for the two motors.

If the ascertainment of a movement variable of one motor of the first and second motors or of the working apparatus requires the inclusion of a transmission ratio of the working transmission, a slip-free operation of the working transmission is always assumed for this case.

The target speed of the one invariably speed-controlled motor is preferably obtained starting from a desired or required target working speed of the working apparatus. From the setpoint working speed of the working apparatus, the control device ascertains an intermediate target speed of the speed-controlled one motor by application of the transmission ratio of the working transmission known for the speed-controlled one motor.

If the other motor of the first and second motors is also speed-controlled, then the control device likewise ascertains an intermediate target speed of the speed-controlled other motor by application of the transmission ratio of the working transmission known for the speed-controlled other motor.

The two intermediate target speeds thus ascertained necessarily behave relative to each other like the transmission ratios of the working transmission for the two motors. As the inventors realized, the direct application of these intermediate target speeds may result in instabilities in controlling the two motors.

In order to avoid such instabilities, the control device preferably carries out a finalization process, in which at least an intermediate target speed of one motor is modified into a target speed in such a way that the quantitative separation of the two finalized target speeds from each other increases. For this purpose, the control device may implement at least one of the measures described below:

i) The higher of the two intermediate target speeds is increased,
ii) The lower of the two intermediate target speeds is decreased.

It is not necessary for the increase of the quantitative difference of the two intermediate target speeds to be great. An increase of the higher intermediate target speed by less than 3% is quite sufficient as an individual measure. Likewise, a decrease of the lower intermediate target speed by less than 3% suffices as an individual measure. If both the higher as well as the lower intermediate target speed are modified in the aforementioned sense in the finalization, then each of the modifications may quantitatively lower than in an individual measure performed on only one intermediate target speed in order to achieve the same change in the quantitative difference of the intermediate target speeds from each other and thereby achieve the same control effect.

Instead of a percentage increase of the quantitative difference of the intermediate target speeds, the difference may be increased by a predetermined differential amount, for example by 10 to 20 rotations per minute, preferably by 15 rotations per minute. The predetermined differential amount also may be applied only to one intermediate target speed or may be distributed to both intermediate target speeds. This makes it possible to produce a kind of "kinematic tension" between the two motors via the working transmission that couples them kinematically, which prevents for example the two motors operated by a common control device from mutually maneuvering themselves into an undesired operating state of rising speeds.

To simplify the control process, preferably only the ascertained intermediate target speed of one of the two motors is modified in the finalization, while the ascertained intermediate target speed of the other of the two motors is preferably maintained as the target speed.

The target speeds, to which the control device controls the first and the second motor, are then the intermediate target speeds finalized by the finalization process.

The equivalent applies in the event that the other motor is torque-controlled. The ascertainment of the target speed of the speed-controlled one motor preferably occurs as already previously described on the basis of the setpoint working speed of the working apparatus. The target speed thus ascertained is the target variable of the speed-controlled one motor.

In the case of a torque-controlled other motor, the control device must first ascertain what torque the speed-controlled one motor outputs at its target speed. The ascertained torque value of the torque-controlled motor is modified, in particular reduced, in order to obtain a target torque for the torque-controlled other motor. On this basis, the control device is able to operate the torque-controlled other motor in an operating state in which the other motor outputs the target torque, which is modified, in particular reduced, by the predetermined value compared to the torque of the torque-controlled one motor. In this instance, again, the differential ratio of the output torque of the speed-controlled one motor and of the setpoint torque of the torque-controlled other motor differs from the differential ratio of the transmission ratios of the working transmission for the first and the second motor. This also result in the aforementioned "kinematic tension" of the two motors kinematically coupled to each other by the working transmission. The predetermined value may be an additive or subtractive value or may be a factor, for example 95% relative to the torque effected by the one motor on the working apparatus.

Preferably, the motor having the greater speed-reducing transmission ratio is the invariably speed-controlled motor. The respective other motor having the lower speed-reducing transmission ratio may then be speed-controlled or torque-controlled as a function of operating parameters of the invariably speed-controlled motor.

The control device may implement the aforementioned method when the first and the second motor both transmit motor power output to the working apparatus via the working transmission. This is not the only operating mode, however, in which the earth working machine may be operated. In general, the control device is able to operate the self-propelled earth working machine in at least the following three operating modes:

1) only one motor of the first and second motors transmits torque via the working transmission to the working apparatus and only one other motor of the first and second motors transmits torque via the function transmission to the at least one function apparatus,
2) both motors of the first and second motors transmit torque via the working transmission to the working apparatus,
3) only one motor of the first and second motors transmits torque both via the working transmission to the working apparatus as well as via the function transmission to the at least one function apparatus, while the respective other motor of the first and second motors is switched off.

The aforementioned method consequently relates to the aforementioned operating mode 2).

The present invention finally also relates to a self-propelled earth working machine, which is constructed according to the above description and which comprises a control device, the earth working machine, in particular its control device, being designed to carry out a method according to the above description.

BRIEF DESCRIPTION OF THE DRAWINGS

The present invention is described in more detail below with reference to the accompanying drawings. The figures show.

DETAILED DESCRIPTION

Figure 1:
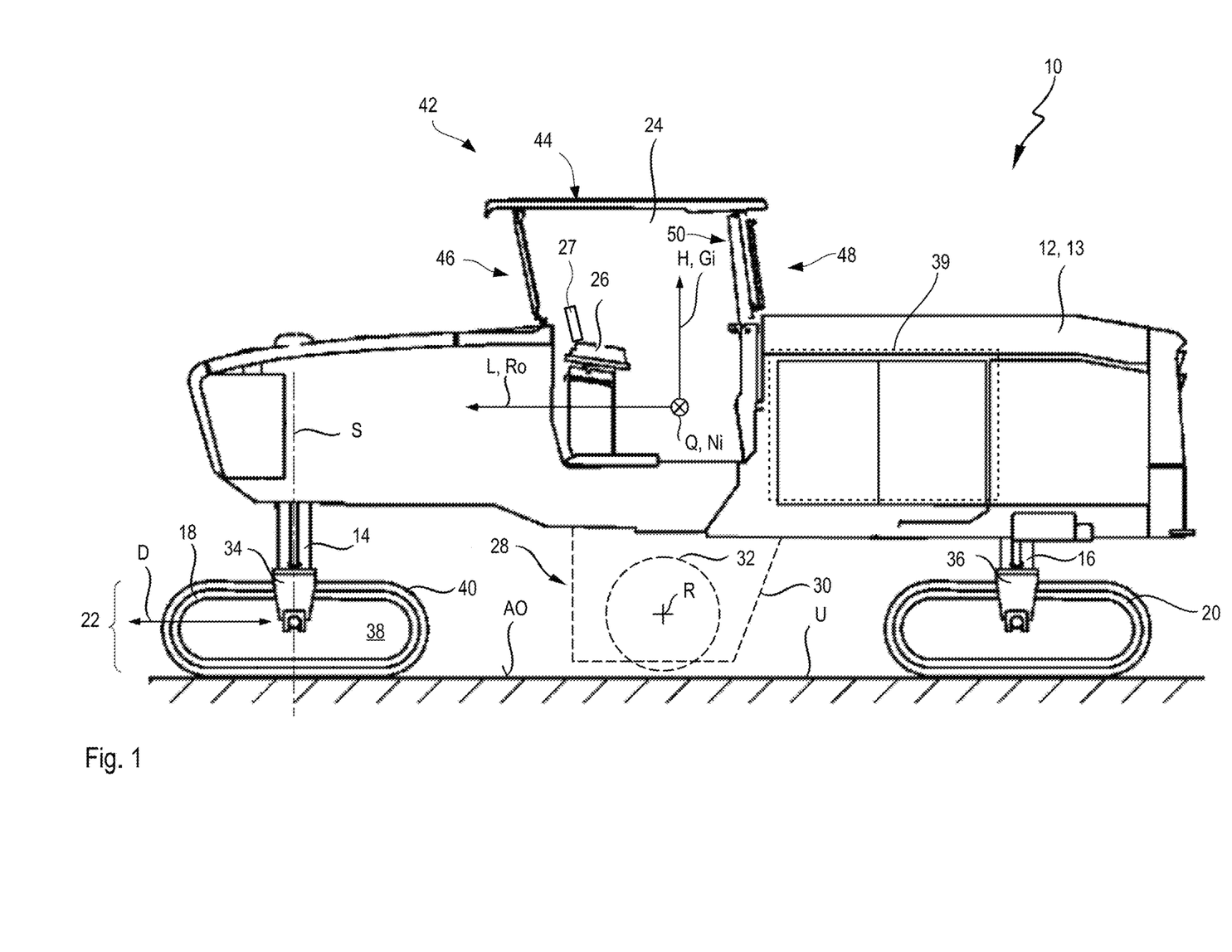
FIG. 1 a rough schematic side view of an earth working machine according to a specific embodiment of the present invention, FIG. 2 a rough schematic side view of the drive system, of the working transmission, of the working apparatus and of the function transmission of the earth working machine of FIG. 1, and FIG. 3 a rough schematic top view of the drive system, of the working transmission, of the working apparatus and of the function transmission of the earth working machine of FIG. 1.

In FIG. 1, a specific embodiment according to the invention of an earth working machine in the form of a large earth or road milling machine is generally indicated by reference numeral 10. It comprises a machine frame 12, which forms the basic framework for a machine body 13. The machine body 13 comprises the machine frame 12 and components of machine 10, which are connected to the machine frame 12 and which are, if indicated, movable relative thereto.

Machine body 13 comprises front lifting columns 14 and rear lifting columns 16, which are connected at one end to machine frame 12 and at the other end respectively to front drive units 18 and to rear drive units 20. The distance of the machine frame 12 from the drive units 18 and 20 is variable by way of lifting columns 14 and 16.

The drive units 18 and 20 are depicted by way of example as crawler track units. In a departure therefrom, individual, or all, drive units 18 and/or 20 may also be wheel drive units.

The viewer of FIG. 1 is looking onto the earth working machine (or simply "machine") 10 in the direction of the transverse direction Q of the machine, which is orthogonal to the drawing plane of FIG. 1. A longitudinal machine direction orthogonal to transverse machine direction Q is labeled L and extends parallel to the drawing plane of FIG. 1. A vertical machine direction H likewise extends in parallel to the drawing plane of FIG. 1 and orthogonally to longitudinal machine direction L and transverse machine direction Q. The arrowhead of longitudinal machine direction L in FIG. 1 points in the forward direction. Vertical machine direction H extends in parallel to the yaw axis Gi of machine 10, longitudinal machine direction L extends in parallel to the roll axis Ro, and transverse machine direction Q extends in parallel to pitch axis Ni.

The earth working machine 10 comprises an operator's platform 24, from which a machine operator is able to control machine 10 via a control panel 26 as a control device of the earth working machine 10. Control panel 26 comprises an operator display 27, for example a touch screen. The control device comprises integrated circuits as well as a data memory.

Arranged below machine frame 12 is a working assembly 28, here represented, for example, as a milling assembly 28 having a milling drum 32, accommodated in a milling drum housing 30, that is rotatable about a milling axis R extending in transverse machine direction Q so that ground material may be removed therewith during an earth working operation, starting from contact surface AO of the ground U to a milling depth determined by the relative vertical position of machine frame 12. The milling drum 32 is therefore a working apparatus in the sense of the present application and a first power recipient. Alternatively or additionally, the milling drum 32 may be accommodated on the machine frame 12 so as to be vertically adjustable relative to the machine frame 12.

The vertical adjustability of machine frame 12 by way of lifting columns 14 and 16 normally also serves to set the milling depth, or generally working depth, of machine 10 in earth working operation. Earth working machine 10 depicted by way of example is a large milling machine, for which the placement of the milling assembly 28 between the front and rear drive units 18 and 20 in longitudinal machine direction L is typical. Large milling machines of this kind, or indeed earth-removing machines in general, may comprise a transport belt so that removed earth material can be transported away from the machine 10. In the interest of better clarity, a transport belt that is in principle also present in the case of machine 10 is not depicted in FIG. 1.

It is not apparent in the lateral view of FIG. 1 that machine 10 comprises both in its front end region as well as in its rear end region respectively two lifting columns 14 and 16 each having a drive unit 18 and 20, respectively, connected to it. Each front lifting column 14 is connected to the respective drive unit 18, in a manner also known per se, by a drive unit connecting structure 34, for example a connecting fork fitting around the respective drive unit 18 in the transverse machine direction Q. Each rear lifting column 16 is connected to its respective drive unit 20 via a respective drive unit connecting structure 36 constructed identically to the drive unit connecting structure 34. Drive units 18 and 20 are of substantially identical construction and constitute the traveling gear 22 of the machine. Drive units 18 and 20 are motor-driven, normally by a hydraulic motor (not depicted).

The drive power source of machine 10 is formed by a drive system 39 accommodated on the machine frame 12, which is illustrated in more detail in FIGS. 2 and 3 and which will be explained in connection with the latter. In the illustrated exemplary embodiment, the milling drum 32 is driven to rotate about milling axis R by drive system 39. The power output of drive system 39 furthermore supplies a hydraulic pressure reservoir on machine 10, which makes it possible to operate hydraulic motors and hydraulic actuators on the machine. Drive system 39 is thus also the source of the propulsive power of machine 10. Drive system 39 supplies power to all power recipients mentioned in the exemplary embodiment, that is, it supplies working drive power to the milling drum 32 and it supplies function drive power to function apparatuses mentioned further below.

In the illustrated example, drive units 18, having a travel direction indicated by double arrow D, respectively comprise one radially inner accommodation and guidance structure 38 on which respectively one circulating drive track 40 is arranged and is guided for circulating movement.

The front lifting columns 14 and with them the drive units 18 are rotatable about a steering axis S by way of a steering apparatus (not illustrated further). Preferably additionally, but also alternatively, lifting columns 16, and with them the drive units 20, may be rotatable by way of a steering apparatus about a steering axis parallel to steering axis S.

The operator's platform 24 is covered by a protective canopy structure 42, which comprises a protective canopy 44, which is connected to the machine frame 12 or machine body 13 via a front window configuration 46 and a rear wall configuration 48. The protective canopy 44 is situated on the machine frame 12 by a movement guide 50 so that it can be raised or lowered. In FIG. 1, the protective canopy 44 is shown in its raised operating position, in which the machine 10 is ready for working operation.

Figure 2:
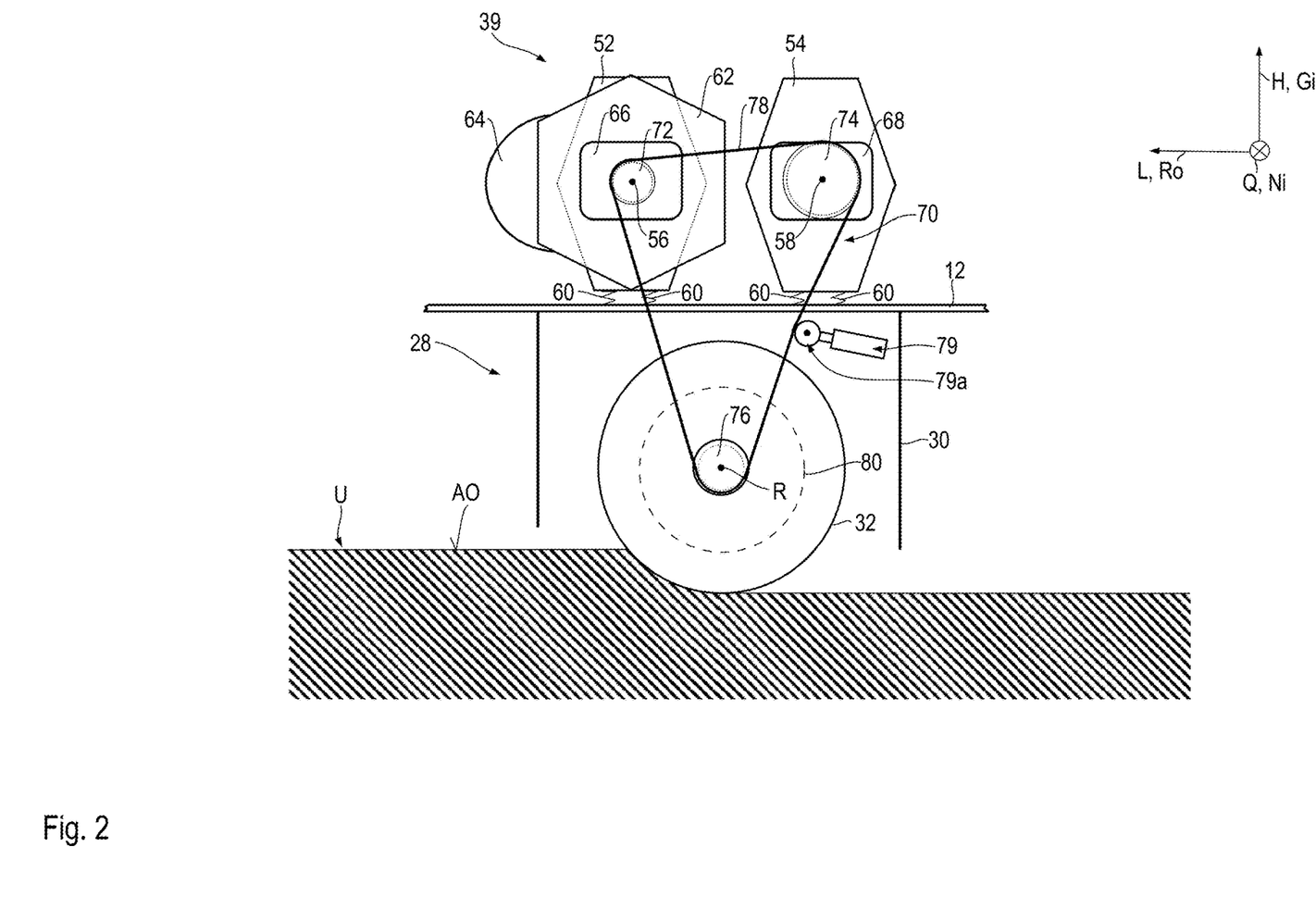

FIG. 2 shows the drive system 39 and the associated units in greater detail. In FIG. 2, the viewer looks onto drive system 39 in the same direction as in FIG. 1, that is, in parallel to the transverse machine direction Q.

The drive system 39 comprises a first diesel engine 52 and a second diesel engine 54, which are situated side-by-side and with parallel axes of rotation 56 and 58 of their crank or output shafts and elastic engine mounts 60 on machine frame 12.

A function transmission 62 in the form of a transfer gear is situated between the viewer of FIG. 2 and the first diesel engine 52, which is permanently coupled to the output shaft of the first diesel engine 52 for transmitting torque. On function transmission 62, a hydraulic pump 64 is situated on an output as a function apparatus and a further power recipient, so that the hydraulic pump 64 can always be operated by the first diesel engine 52 via function transmission 62.

Between the viewer of FIG. 2 and the function transmission 62, a first switchable clutch 66 is situated, by which it is possible to interrupt or establish a transmission of torque of the first diesel engine 52. Due to the arrangement of the first switchable clutch 66 in the torque path of the first diesel engine 52 downstream from the function transmission 62, the switching state of the first switchable clutch 66 has no effect on a torque transmission of the first diesel engine 52 to the function transmission 62.

Between the viewer of FIG. 2 and the second diesel engine 54, a second switchable clutch 68 is situated, by which it is possible to interrupt or establish a transmission of torque of the second diesel engine 54.

Between the viewer of FIG. 2 and the switchable clutches 66 and 68 on the one hand and the milling drum 32 on the other hand, a working transmission 70 is situated, which comprises a traction drive, in the illustrated exemplary embodiment more precisely a force-locking belt transmission.

The working transmission 70 comprises three deflection pulleys 72, 74 and 76 and a belt 78, which runs in closed fashion around the three deflection pulleys 72, 74 and 76. In a manner known per se, a belt tensioner 79 provides sufficient tension of the belt 78 and thus sufficient contact pressure in the area where it loops around the deflection pulleys 72, 74 and 76. A first deflection pulley 72 is connected via the first switchable clutch 66 to the first diesel engine 52 for joint rotation, a second deflection pulley 74 is connected via the second switchable clutch 68 to the second diesel engine 52 for joint rotation, and a third deflection pulley 78 is connected to the milling drum 32.

The diameters of the three deflection pulleys 72, 74 and 76 are selected in such a way that a different speed-reducing and torque-increasing transmission ratio exists between the first deflection pulley 72 and the third deflection pulley 76 than between the second deflection pulley 74 and the third deflection pulley 76.

Figure 3:
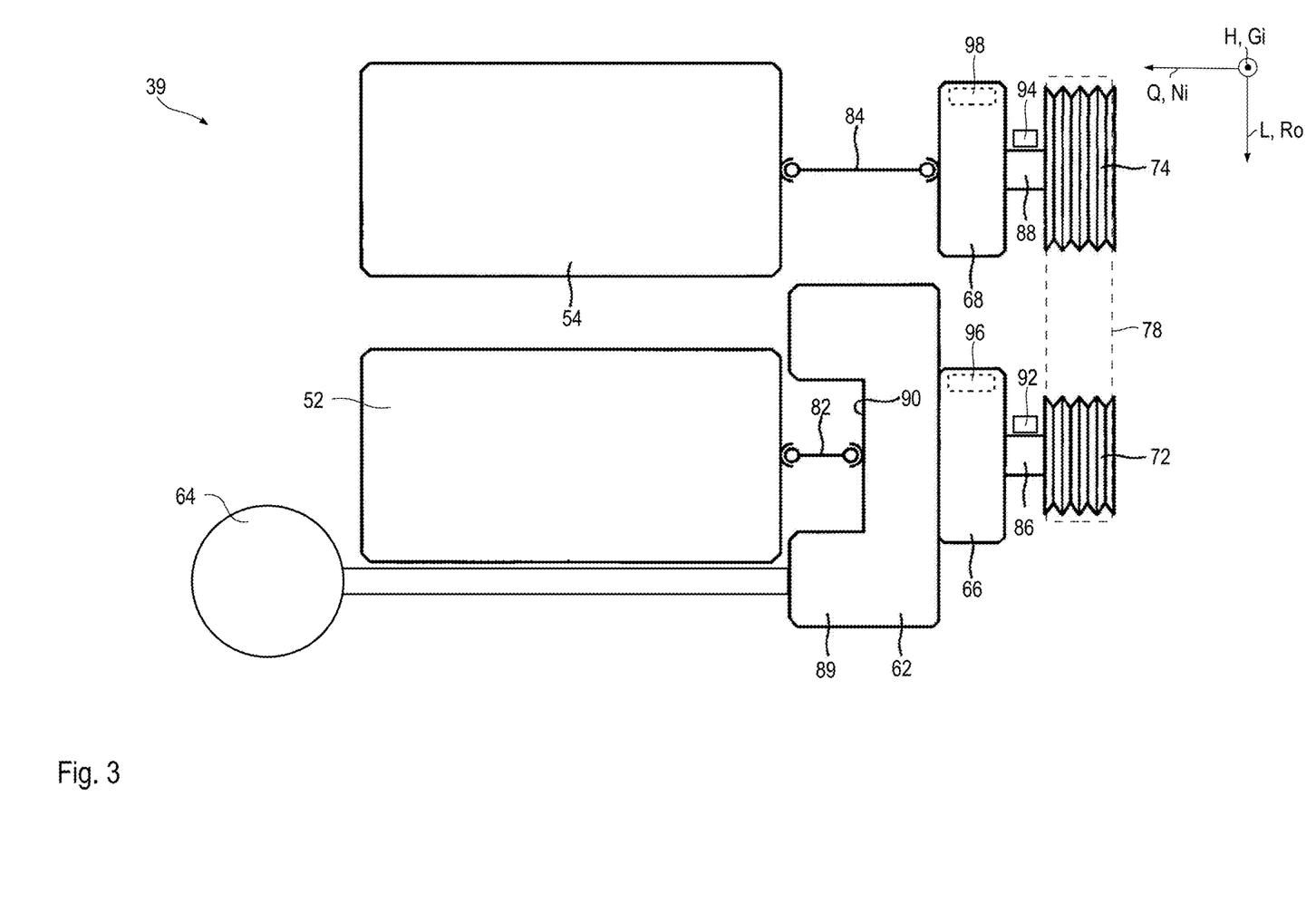

FIGS. 1 through 3 are not true to scale. The purpose here is merely to express the fact that for example the second deflection pulley 74 has a greater diameter than the first deflection pulley 72, so that the speed of the second diesel engine 54 is reduced less toward the milling drum 32 than the speed of the first diesel engine 52. For example, the speed of the first diesel engine 52 at the milling axis R and thus at milling drum 32 is reduced to a value between about one eighteenth and one twentieth. For example, the speed of the second diesel engine 54 at the milling axis R and thus at milling drum 32 is reduced to a value between about one fourteenth and one sixteenth.

The working transmission 70 may have a further speed-reducing planetary gear 80 provided between the third deflection pulley 76 and the milling drum 32, which contributes to the aforementioned transmission ratios. The different transmission ratios for the first diesel engine 52 and the second diesel engine 54 are preferably implemented exclusively by the deflection pulleys 72, 74 and 76. The planetary gear 80 transmits torque from the third deflection pulley 76 to the milling drum 32 always at the same transmission ratio, regardless of which diesel engine provides the working drive power at the time.

FIG. 3 shows the system of FIG. 2 with the exception of belt tensioner 79 in a top view.

In rough schematic fashion, the figure shows that the first diesel engine 52 is connected to the function transmission 62 via a first elastic shaft connection 82 and that the second diesel engine 54 is connected to the second switchable clutch 68 via a second elastic shaft connection 84. The elastic shaft connection may be any device suitable for compensating for a radial offset between the end areas of a rotating shaft such as a cardan connection or an elastomeric coupling. Since thus a certain radial offset in the torque paths of the first and of the second diesel engines 52 and 54, as may be caused by the elastic engine mounts 60, can already be compensated by the elastic shaft connections 82 and 84, respectively, the first switchable clutch 66 and the second switchable clutch 68 may be connected in rotatably fixed fashion to the first deflection pulley 72 and to the second deflection pulley 74 via a rigid drive shaft 86 and 88, respectively.

A second hydraulic pump 89 as a further function apparatus and as a further power recipient may be situated directly in the housing 90 of the function transmission 62. This is even preferably the case.

For reasons of the best possible use of space while adhering to transport dimensions that may be moved without special permits, the two diesel engines 52 and 54 are arranged with their crankshafts running in parallel to the transverse machine direction Q. This preferred arrangement applies not only for the present exemplary embodiment, but quite generally.

In the same way, the crankshafts of the two diesel engines 52 and 54 are in general preferably arranged in parallel to the milling axis R. Furthermore, the axes of rotation of all further rotating components of the working transmission 70, that is, of the deflection pulleys 72, 74 and 76 and of all further rotating components of the function transmission 62 are in general preferably arranged in parallel to one another and preferably also arranged in parallel both to the milling axis R as well as to the crankshafts of the diesel engines 52.

The control panel 26 functioning as the control device is able to operate the milling drum 32 in three different operating modes: driving the milling drum 32 using solely the first diesel engine 52, in which case the function apparatuses 64 and 89 mentioned by way of example are at the same time also operated via the function transmission 62, for example when there is a lower speed requirement for the milling drum 32; driving the milling drum 32 using solely the second diesel engine 54 when there is a higher speed requirement for the milling drum 32, in which case the first diesel engine 52 continues to operate the function apparatuses 64 and 89 mentioned by way of example via the function transmission 62; and driving the milling drum 32 using both diesel engines 52 and 54 jointly when there is a particularly high power requirement for the milling drum 32.

By machine operator input via the operating display 27, the control device is able to select the operating modes autonomously depending on how the machine operator assesses the properties, in particular the hardness, of the ground U to be worked, and at what milling depth and at what travel speed the machine operator wishes to perform the milling operation. Alternatively, the control device itself may ascertain properties of the ground to be worked from acquired operating parameter values and incorporate these results into controlling the milling drum 32 and/or the two diesel engines 52 and 54. For this purpose, corresponding databases may be stored in the control device, which combines the parameter characterizing the ground to be worked as well as the desired milling parameters of travel speed and milling depth with operating parameters of the first and of the second diesel engines 52 and 54. The control device selects the operating modes inter alia by switching the switchable clutches 66 and 68 accordingly.

For example, if the milling drum 32 is to be driven jointly by both diesel engines 52 and 54, the control device may first ascertain for the first diesel engine 52 a target speed selected for the respective milling task. Since the control device is able to access a database, in which the transmission ratio of the engine power output of the first diesel engine 52 to the milling drum 32 is stored, the control device is able to calculate from a desired speed of the milling drum 32 the speed of the first diesel engine 52 required for this purpose.

If the second diesel engine 54 is torque-controlled, the control device controls the first diesel engine 52 to the ascertained target speed, the control device acquiring for this purpose the speed of the first diesel engine 52 using the speed sensor 92.

At or near the target speed, the control device acquires the torque output by the first diesel engine 52 via the torque sensor 96, which may be situated, by way of example, in the first switchable clutch 66.

Subsequently, the control device starts controlling the second diesel engine 54 in terms of its torque. For this purpose, the control device uses the acquired torque output by the first diesel engine 52 as a basis and reduces its magnitude by a predetermined measure. The reduction of the magnitude of the torque may be performed additively by subtraction of a predetermined torque differential, that is, by addition of a negative differential magnitude, or may be performed multiplicatively by multiplication with a factor that is selected to be smaller than 1.

In this manner, the control device ascertains the magnitude of the torque to be output by the second diesel engine 54. With the aid of the torque sensor 98 in the second switchable clutch 68, the control device then controls the diesel engine 54 in such a way that the latter outputs the ascertained setpoint torque.

Alternatively, the second diesel engine 54 may also be speed-controlled like the first diesel engine 52.

This control process initially also starts from the target speed for the first diesel engine 52 ascertained for the first diesel engine 52 from the setpoint milling drum speed. On the basis of the setpoint milling drum speed, the control device also ascertains a target speed for the second diesel engine 54 based on the transmission ratio of the working transmission 70 for the second diesel engine 54. In the illustrated exemplary embodiment, at an identical milling drum speed, the first diesel engine 52 always rotates faster than the second diesel engine 54.

Prior to their application, the two ascertained target speeds are finalized by the control device in order to obtain a control operation that is as stable as possible. In the process, the difference in magnitude of the target speeds ascertained from the setpoint milling drum speed is increased. This may occur, for example, in that the control device increases the target speed of the first diesel engine 52, for example by 15 r.p.m., or reduces the target speed of the second diesel engine 54, for example by 15 r.p.m., or increases the target speed of the first diesel engine 52 and reduces the target speed of the second diesel engine 54, for example in order to increase in sum the target speed differential by 15 r.p.m. The control device then controls the first diesel engine 52 and the second diesel engine 54 to their finalized target speeds, making use of the speed sensors 92 and 94 for this purpose.

In the described specific embodiment, the first diesel engine 52 is the invariably speed-controlled motor, on the operation of which the control of the second diesel engine 54 is based. If, by contrast, in the same working transmission 70, the second diesel engine 54 were the invariably speed-controlled engine, which is likewise possible, then the first diesel engine 52 would be controlled according to one of the above method by adhering to the described control principles.

In the illustrated specific embodiment, the function transmission 62 is permanently assigned to the first diesel engine 52 having the greater speed reduction ratio. In a variant, the function transmission 62 may be permanently assigned to the second diesel engine 54 having the lower speed reduction ratio.

It should be added that the belt tensioner 79 may have a motor-driven roller 79a and may thus be used as an auxiliary drive during maintenance work on the milling drum 32. The milling drum can thereby be rotated at a low speed in order visually to check the outer side of the milling drum and to repair or exchange components such as milling bits, bit holders or bit exchange holders in need of repair or exchange. A milling operation using the belt tensioner 79 as auxiliary drive is not possible, however, due to the fact that the drive torque of the belt tensioner 79 is too low.

The invention claimed is:

1. A self-propelled earth working machine, comprising:
   a machine frame;
   a traveling gear configured to support the machine frame from a ground surface;
   a working apparatus configured to perform an earth working movement relative to the machine frame, the working apparatus being supported from the machine frame as a first power recipient;
   at least one function apparatus distinct from the working apparatus, the at least one function apparatus being a further power recipient;
   a drive system supported from the machine frame and configured to provide a working drive power to the working apparatus and a function drive power to the at least one function apparatus, the drive system including a first motor and a second motor;
   a function transmission configured to transmit torque between the drive system and the at least one function apparatus; and
   a working transmission configured to transmit torque between the drive system and the working apparatus, the working transmission connecting the first motor and the second motor to the working apparatus for the transmission of torque such that the working apparatus may be driven to perform the earth working movement solely by the first motor or solely by the second motor or jointly by the first and second motors, wherein the working transmission connects the first motor to the working apparatus at a first transmission ratio and connects the second motor to the working apparatus at a second transmission ratio different from the first transmission ratio.

2. The self-propelled earth working machine of claim 1, wherein the working transmission includes:
   a first rotating transmission component having a first effective diameter connected to the first motor for joint rotation with the first motor;
   a second rotating transmission component having a second effective diameter connected to the second motor for joint rotation with the second motor, the second effective diameter being different from the first effective diameter;
   wherein the first rotating transmission component is situated in a torque path from the first motor to the second transmission component between the first motor and the second transmission component; and
   wherein the second rotating transmission component is situated in a torque path from the second motor to the first rotating transmission component between the second motor and the first rotating transmission component.

3. The self-propelled earth working machine of claim 2, wherein:
   the working transmission includes a traction drive.

4. The self-propelled earth working machine of claim 2, wherein:
   the first rotating transmission component includes a first deflection pulley deflecting a traction belt; and
   the second rotating transmission component includes a second deflection pulley deflecting the traction belt.

5. The self-propelled earth working machine of claim 1, further comprising:
   a first switchable clutch situated in a first torque path between the first motor and the working apparatus, the first switchable clutch being configured to selectively interrupt or close the first torque path as a function of a switching state of the first switchable clutch; and
   a second switchable clutch situated in a second torque path between the second motor and the working apparatus, the second switchable clutch being configured to selectively interrupt or close the second torque path as a function of a switching state of the second switchable clutch.

6. The self-propelled earth working machine of claim 5, wherein:
   for one motor of the first and second motors the one of the first and second switchable clutches situated in the one of the first and second torque paths between the one motor and the working apparatus interrupts a transmission of torque from the one motor to the working apparatus as a function of the switching state of the one of the switchable clutches, but does not interrupt a transmission of torque from the one motor to the function transmission; and
   for the other motor of the first and second motors the other switchable clutch situated in the other torque path between the other motor and the working apparatus interrupts both a transmission of torque from the other motor to the working apparatus and a transmission of torque from the other motor to the function transmission.

7. The self-propelled earth working machine of claim 1, wherein:
   the function transmission is a transfer gear including a number of output shafts greater than its number of input shafts.

8. The self-propelled earth working machine of claim 1, wherein:
   the at least one function apparatus includes at least one liquid pump and/or at least one gas pump and/or at least one electric generator and/or at least one mechanical auxiliary drive.

9. The self-propelled earth working machine of claim 1, wherein:
   the working apparatus includes an earth-removing milling drum configured to rotate about a milling axis.

10. The self-propelled earth working machine of claim 1, wherein:
    the working transmission is configured to transmit power output of both the first motor and the second motor to the working apparatus, while reducing rotational speed of the working apparatus as compared to rotational speeds the first motor and the second motor, and while stepping up a torque of the working apparatus as compared to torque output of the first motor and the second motor.

11. The self-propelled earth working machine of claim 1, further comprising:
    a controller configured such that, when the first motor and the second motor are simultaneously outputting power to the working apparatus, the controller:
      controls one of the first and second motors to a target speed determined by taking into account a user input and/or at least one acquired value of a sensor and/or a query of a data relationship; and
      controls the other of the first and second motors to a movement variable of speed and/or torque, the value of the movement variable differing from a value of the same movement variable of the speed-controlled one motor by a differential ratio differing from a differential ratio of the first and second transmission ratios of the working transmission.

12. The self-propelled earth working machine of claim 11, wherein:
    the other motor is also speed-controlled by the controller, and the controller is further configured to:
      ascertain a first intermediate target speed for the first motor starting from a setpoint working speed of the working apparatus determined by a user input and/or by at least one acquired value of a sensor and/or by query of a data relationship, taking into account the first transmission ratio;
      ascertain a second intermediate target speed for the second motor by taking into account the second transmission ratio; and
      modify the first and/or the second intermediate target speed in a finalization process such that a difference between a first finalized target speed for the first motor and a second finalized target speed for the second motor is greater than a difference between the first and second intermediate target speeds.

13. The self-propelled earth working machine of claim 11, wherein:
    the other motor is torque-controlled by the controller, and the controller is further configured to:
      ascertain a torque output by the speed-controlled motor; and select a setpoint torque of the torque-controlled motor to be lower than the torque output of the speed-controlled motor, a differential ratio of the torque output of the speed-controlled motor and the setpoint torque of the torque-controlled motor differing from a differential ratio of the first transmission ratio and the second transmission ratio.

14. The self-propelled earth working machine of claim 11, wherein:
the controller is configured to operate the self-propelled earth working machine in at least the following three operating modes:
a first mode wherein only one motor of the first and second motors transmits torque by the working transmission to the working apparatus and only one other motor of the first and second motors transmits torque by the function transmission to the at least one function apparatus;
a second mode wherein both of the first and second motors transmit torque by the working transmission to the working apparatus; and
a third mode wherein only one motor of the first and second motors transmits torque both by the working transmission to the working apparatus and by the function transmission to the at least one function apparatus, while the other motor of the first and second motors is switched off.

15. A method of controlling a self-propelled earth working machine, the earth working machine including a machine frame, a traveling gear configured to support the machine frame from a ground surface, a working apparatus configured to perform an earth working movement relative to the machine frame, at least one function apparatus distinct from the working apparatus, a drive system supported from the machine frame and configured to provide a working drive power to the working apparatus and a function drive power to the at least one function apparatus, the drive system including a first motor and a second motor, a function transmission configured to transmit torque between the drive system and the at least one function apparatus, and a working transmission configured to transmit torque between the drive system and the working apparatus, the method comprising:
transmitting torque by the working transmission jointly from the first motor to the working apparatus at a first transmission ratio and from the second motor to the working apparatus at a second transmission ratio different from the first transmission ratio;
controlling with a controller one of the first and second motors to a target speed determined by taking into account a user input and/or at least one acquired value of a sensor and/or a query of a data relationship; and
controlling with the controller the other of the first and second motors to a movement variable of speed and/or torque, the value of the movement variable differing from a value of the same movement variable of the speed-controlled one motor by a differential ratio differing from a differential ratio of the first and second transmission ratios of the working transmission.

16. The method of claim 15, wherein:
controlling with the controller the other of the first and second motors to a movement variable of speed and/or torque includes controlling the other of the first and second motors to a target speed by:
ascertaining a first intermediate target speed for the first motor starting from a setpoint working speed of the working apparatus determined by a user input and/or by at least one acquired value of a sensor and/or by query of a data relationship, taking into account the first transmission ratio;
ascertaining a second intermediate target speed for the second motor by taking into account the second transmission ratio; and
modifying the first and/or the second intermediate target speed in a finalization process such that a difference between a first finalized target speed for the first motor and a second finalized target speed for the second motor is greater than a difference between the first and second intermediate target speeds.

17. The method of claim 15, wherein:
controlling with the controller the other of the first and second motors to a movement variable of speed and/or torque includes torque-controlling the other of the first and second motors by:
ascertaining a torque output by the speed-controlled motor; and
selecting a setpoint torque of the torque-controlled motor to be lower than the torque output of the speed-controlled motor, a differential ratio of the torque output of the speed-controlled motor and the setpoint torque of the torque-controlled motor differing from a differential ratio of the first transmission ratio and the second transmission ratio.

18. The method of claim 15, further comprising:
selectively operating the controller in a further mode of operation wherein only one motor of the first and second motors transmits torque by the working transmission to the working apparatus and only one other motor of the first and second motors transmits torque by the function transmission to the at least one function apparatus.

19. The method of claim 15, further comprising:
selectively operating the controller in a further mode of operation wherein only one motor of the first and second motors transmits torque both by the working transmission to the working apparatus and by the function transmission to the at least one function apparatus, while the other motor of the first and second motors is switched off.

* * * * *